United States Patent
Cioffi et al.

(10) Patent No.: US 8,064,325 B1
(45) Date of Patent: Nov. 22, 2011

(54) CONCURRENT FREQUENCY-SHARING MULTI-USER COMMUNICATION SYSTEM WITH RATE ALLOCATION APPROACH

(75) Inventors: John M. Cioffi, Atherton, CA (US); Avneesh Agrawal, San Diego, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 2695 days.

(21) Appl. No.: 10/692,297

(22) Filed: Oct. 23, 2003

Related U.S. Application Data

(60) Provisional application No. 60/420,938, filed on Oct. 23, 2002.

(51) Int. Cl.
*H04J 11/00* (2006.01)
(52) U.S. Cl. .................................................. 370/203
(58) Field of Classification Search .......... 370/203–208, 370/310, 328–330, 342, 431, 432, 437, 441
See application file for complete search history.

(56) References Cited

U.S. PATENT DOCUMENTS

| | | | | |
|---|---|---|---|---|
| 5,671,218 A | * | 9/1997 | I et al. .......................... | 370/252 |
| 5,914,950 A | * | 6/1999 | Tiedemann et al. ........... | 370/348 |
| 5,923,650 A | * | 7/1999 | Chen et al. .................... | 370/331 |
| 6,005,855 A | * | 12/1999 | Zehavi et al. ................. | 370/335 |
| 6,335,922 B1 | * | 1/2002 | Tiedemann et al. ........... | 370/335 |
| 6,563,810 B1 | * | 5/2003 | Corazza ........................ | 370/335 |
| 6,662,024 B2 | * | 12/2003 | Walton et al. ............... | 455/562.1 |
| 7,116,652 B2 | * | 10/2006 | Lozano ........................ | 370/334 |
| 7,167,487 B2 | * | 1/2007 | Herrmann ..................... | 370/477 |
| 2002/0136397 A1 | | 9/2002 | Zeng et al. | |
| 2003/0086362 A1 | | 5/2003 | Hasegawa et al. | |

OTHER PUBLICATIONS

IEEE Dictionary of IEEE standard terms, IEEE, 2000, pp. 1, 2 and 1249.*
A. Agrawal and J. Ciotti, "Power Control for Multiuser Space-Time CDMA," GLOBECOM 2002.

* cited by examiner

*Primary Examiner* — Dmitry H Levitan
(74) *Attorney, Agent, or Firm* — Crawford Maunu PLLC

(57) ABSTRACT

According to example embodiments for use in a communication system that is adapted to permit the users to transmit data simultaneously via shared frequency and spatial resources, an allocation of user transmission rates involves setting and maintaining the transmission rates of the users to at least a minimum user transmission rate to provide an expected minimum quality of communication for each of the users. These rates of the users are incrementally adjusted by iteratively changing the transmission rate of each user as a function of a resulting vector of transmit powers ensuing from the increased transmission rate, a degree of transmission-rate-allocation unfairness relative to the transmission rates of all the users, and a power-based selection criteria. With such an approach, the rates are fairly allocated without a disproportionate allocation of system bandwidth. Various embodiments are applicable to a variety of communication applications including OFDM or CDMA communication systems.

25 Claims, 2 Drawing Sheets

System throughtput for various values of U. MMSE receiver with ideal successive interference cancellation. Selection criteria is minimization of maximum transmit power

CONCURRENT FREQUENCY-SHARING MULTI-USER COMMUNICATION SYSTEM WITH RATE ALLOCATION APPROACH

RELATED PATENT DOCUMENTS

This is a conversion of U.S. Provisional Patent Application Ser. No. 60/420,938, entitled "Rate Allocation for CDMA/OFDM," and filed on Oct. 23, 2002, to which priority is claimed under 35 U.S.C. §119.

FIELD OF THE INVENTION

The present invention relates generally to data communication and more particularly to the management of data rates in links established for data communication systems.

BACKGROUND

Digital data transmission provides communication in a variety of applications including, for example, communication over wired and wireless telephone system infrastructure and various types of area-defined networks. Cellular telephone communication systems are examples of existing telephone system infrastructure, involving both wired and wireless signal communication. Examples of area-defined networks include mobile wireless and digital subscriber link communication systems, and wireless personal area networks ("WPAN"). Each of these types of communication systems have associated standards that define the manner of communication between users over the wired and/or wireless communication channels.

The communication standards for these communication systems may define a frequency range or band that is shared by multiple users to permit simultaneous transmission of the users' respectively-defined information. For example, in multi-carrier communication using existing telephone lines, such systems transmit data using discrete frequency bands or subchannels over telephone-lines typically arranged in a binder with a number of wire pairs in each binder. Each of the multiple users is permitted to transmit simultaneously over an assigned one of wire pairs. In a CDMA (code-division-multiple-access) system, such as a CDMA cellular telephone system, multiple users are permitted to transmit simultaneously in the same frequency, temporal and spatial dimension; the users' respectively-defined information is encoded before transmission, and decoded at the receiver, using a spectral-based signal coding protocol.

An OFDM (orthogonal-frequency-division-multiplex) communication system is typically a multi-carrier system that transmits the respective users' information simultaneously as data bits encoded to multiple sub-carriers. This approach is directed to optimizing use of the allocated frequency band and is applicable, for example, to ADSL, Hiperlan/2, DAB, etc. A set of orthogonal sub-carriers together forms an OFDM symbol. Various approaches for implementing an OFDM system have been considered including the approach described by the IEEE 802.11a OFDM system.

Ideally, each of these systems would be implemented with optimal signal quality at the highest data transmission rate (or throughput). In a typical system, however, an increase in the data transmission rate compromises signal quality due to noise resulting from various system-related issues. For example, in a multi-carrier twisted-pair telephone-line system in which the twisted-pairs are bundled, crosstalk interference arises between twisted pairs arising from electromagnetic coupling within the binder that may degrade the communication signals. As the speed and/or power of data transmission increases, the crosstalk interference becomes more severe. CDMA-based and OFDM-based systems transmit the data from multiple users as symbols via the same, or a shared, frequency band, and a consequential noise concern includes inter-symbol interference (ISI). Thus, in each of these communication systems, signals from different users interfere with one another.

Various approaches have been investigated to address the adverse effects of such multi-user interference. In CDMA-based systems, a combination of user specific signature sequences, multi-user processing at the receiver and spatial processing is used to separate the signals from the different users. Ideally, the objective of the rate allocation is to maximize the achievable rate of each user given the transmit power constraints. However, because user signals interfere with one another, a change in the data rate of one user causes a change in power allocation for all users, and hence it is not possible to simultaneously maximize the rate of every user. Consequently, realizing an ideal system, one that properly allocates transmission rates to each of the users while attempting to maximize the system throughput, has been challenging.

SUMMARY OF THE INVENTION

The present invention is directed to overcoming the above-mentioned challenges and others as may be recognized from the discussion that follows. Embodiments thereof are typically directed to multi-user shared-frequency communication systems and other such systems having throughput and allocation of user transmission rates acting as opposing tensions. The present invention is exemplified in a number of implementations and applications, some of which are summarized below.

According to a general embodiment, the present invention is directed to a communication system that permits multiple users to transmit data simultaneously via shared frequency and spatial resources and allocates user transmission rates via an approach that fairly allocates the transmission rates without a disproportionate allocation of system bandwidth.

According to an example embodiment of the present invention, a communication system is adapted to permit the users to transmit data simultaneously via shared frequency and spatial resources and is adapted to allocate user transmission rates via an approach that involves setting and maintaining the transmission rates of the users. A minimum user transmission rate provides an expected minimum quality of communication for each of the users. These user rates are incrementally adjusted by iteratively changing the transmission rate of each user as a function of a resulting vector of signal power transmitted from the users and ensuing from the increased transmission rate, a degree of transmission-rate-allocation unfairness relative to the transmission rates of all the users, and a system-level selection criteria.

According to more specific embodiments, the above-type system is an OFDM communication system and a CDMA communication system. Other more specific embodiments are directed to terminals, such as receivers, transmitters, transceivers and various types of modems, used in such communication systems, to using user-specific priorities to individually control the rate assignment of each user, and/or to fixed-step iterative power control with binary or ternary feedback also converges to close to the optimum distribution.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
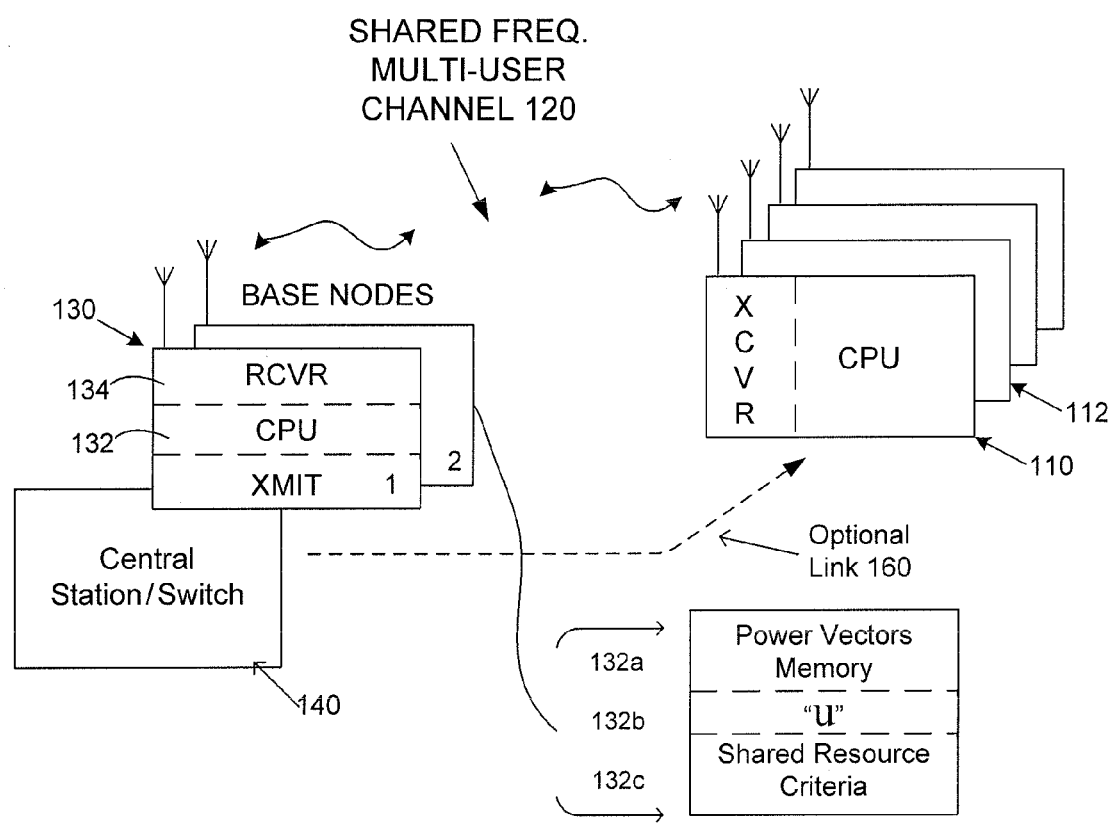
FIG. 1 is a block diagram of a communication system, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to a variety of multi-user shared-frequency communication systems and other such systems having throughput and allocation of user transmission rates acting as opposing tensions, and aspects of the invention have been found to be particularly advantageous for CDMA-type and OFDM-type communication systems where signal interference can arise from the multiple users sharing a common frequency band. While the present invention is not necessarily limited to such applications, various aspects of the invention may be appreciated through a discussion of various examples using this context.

According to a first example embodiment of the present invention, a communication system permits multiple data-transmission terminals to compete for common frequency space at the same time and in the same spatial realm. In this regard, the data-transmission terminals are transmitting their respective sets of data symbols in a manner that is susceptible to at least negligible levels of inter-symbol interference. Toward a goal of allocating the transmission rates without a disproportionate allocation of system bandwidth, the system ensures that the transmission rates of the users do not fall below a minimum-level user transmission rate to provide an expected minimum quality of communication for each of the users. These rates of the users are incrementally adjusted by changing the transmission rate of each user as a function of a resulting vector of transmit powers ensuing from the increased transmission rate, a degree of transmission-rate-allocation unfairness relative to the transmission rates of all the users, and a system-level selection criteria that is typically a function of transmission power for certain user rate allocations. The above adjustments can occur iteratively until none of the transmission rates satisfies the power-based selection criteria and/or satisfies the degree of transmission-rate-allocation unfairness. Typically, these rate adjustments are made to maximize the achievable rate of every user given the transmit power constraints.

Consistent with the above-described approach, FIG. 1 shows such a communication system 100 having multiple user terminals 110, 112, etc. competing for simultaneous use of a shared-frequency channel 120 in order to access at least one remotely-located terminal 130. The skilled artisan would appreciate that different applications require different system types. In an OFDM-type application, according to the present invention, each of the multiple user terminals 110, 112 of the system 100 are DSL-type modems, channel 120 includes pairs of twisted-pair telephone lines, and terminal 130 is an intelligent modem adapted to interface with a central station/ switch (or CO) 140. In a CDMA-type application, communication system 100 is implemented as a CDMA-type cellular communication system with each of the multiple user terminals 110, 112 being cellular-telephones, channel 120 as a wireless CDMA channel, and terminal 130 as a cellular base station adapted to interface with the system's cellular central station/switch 140.

The communication system 100 allocates transmission rates to the multiple users (a.k.a., "user terminals") 110 to provide the users with proper data-transmission rates in a manner that is fair to the users. The terminal 130, using its own programmed CPU 132 (a CPU is well recognized as being clock-based) and/or the CPU intelligence of the system's central station/switch 140, dictates the transmission rates of the users 110, 112 to provide at least a minimum user transmission rate ($R_{min}$) for an expected minimum quality of communication. As shown, the CPU 132 typically includes logic and memory for manipulating (e.g., storing, changing and accessing) recorded power vectors (132a), for manipulating a degree of unfairness (U) in rate allocation (132b), and for manipulating a shared-resource criteria (132c). Transmission-rate instructions are typically provided over the channel 120 or over an optional background data link 160. In combination therewith or as an alternative, each of the users 110, 112 is programmed to store the minimum user transmission rate ($R_{min}$) as a (default) operational mode. The expected minimum quality of communication is typically specification-defined for a given system and/or is variable for an anticipated system operating environment (e.g., fewer than N users or more than M users).

Using the receiver circuitry 134 within the terminal 130 (and as further described herein), shared-frequency power parameters are monitored and used to instruct the users 110, 112 to occasionally adjust each of their respective transmission rates. These transmission rates are usually adjusted one user at a time; however, applications that have needs for more coarse changes may permit adjustments of two or more users at a time, especially at an initial phase. The monitored shared-frequency power parameters inform the system 100 when the system-defined constraints are exceeded in order to iteratively advance the stepping of the transmission rate for designated users 110, 112. In the illustrated example embodiment, each of the designated users 110, 112 includes a CPU circuit that responds to transmission-rate instructions by adjusting a variable-data rate transmitter, typically as part of the user's transceiver. This iterative data-rate allocation process is more specifically defined below for these applications involving multiple data-transmission terminals competing simultaneously for the same frequency space and in the same spatial realm.

The optimal rate allocation for maximizing system throughput may not be a fair allocation in that a disproportionate amount of system bandwidth may be allocated to few users. This is a very real concern, for instance, in cellular systems where propagation path losses may result in as much as 80 dB difference in received power between different users. Without some provision for fairness, users closest to the base station would monopolize the total available bandwidth. A fairness definition for a TDMA system, in which only one user transmits at any time, was provided implicitly in P. Bender, P. Black, M. Grob, R. Padovani, N. Sindhushayana, A. Viterbi, "CDMAIHDR: A Bandwidth-Efficient High-Speed Wireless Data Service for Nomadic Users", *IEEE Communications Magazine, July* 2000. The degree of unfairness (U) in rate allocation can be defined as the ratio of the rates of the maximum rate user to the minimum rate user. i.e., $$U \stackrel{def}{=} \frac{R_{max}}{R_{min}} \quad (1)$$

Thus, U=1 is a very fair allocation with equal rate for all users, while larger values of U are increasingly more unfair allocations. This notion of fairness in the context of a downlink (base station to user terminal) TDMA system, where only one user transmits at any time, and a certain target value of U may be achieved by simply allocating the appropriate number of time slots to the highest rate and lowest rate users. However, the allocation strategy gets considerably more complicated for the uplink of a CDMA system.

In accordance with the present invention, a CDMA/OFDM type system employs a mathematical definition of fairness that provides guidance in the rate allocation strategy, and results in a rate allocation that is intuitively a fair allocation to the multiple users sharing the channel. In this system, each user is guaranteed a minimum rate, $R_{min}$, that ensures a minimum quality of service and the transmission rates are carefully adjusted in view of selection criteria so that the other users sharing the frequency resource are not adversely (or unfairly) impacted. In a more particular embodiment, examples of selection criteria are minimizing average transmit powers, minimizing maximum transmit power, and minimizing total receiver powers (especially useful if the receiver does not have accurate information on transmit powers). Other selection criteria may readily be included.

Mathematically, the system design problem can be represented as $$\max\left(\sum_{i=1}^{K} Ri\right) \quad (2)$$

subject to:

$$p_i \leq p_{i,max} \quad (3)$$

$$\frac{\max(R_i)}{\min(R_j)} \leq U \quad (4)$$

$$R_i \geq R_{min} \quad (5)$$

where Ri is the rate for the $i^{th}$ user, $p_i$ is the transmit power for the $i^{th}$ user and $P_{i,\,max}$ is the maximum permissible transmit power for the $i^{th}$ user. U is the degree of unfairness allowed by the system operator, and $R_{min}$ is the minimum rate guaranteed to all the users.

According to a specific example embodiment, rate allocation is achieved using an algorithm described as follows:
Let ΔR be the smallest possible rate increment.
Step 1: Set the rates of all the users to $R_{min}$.
Step 2: For each user, k, increase its rate by ΔR without changing the rate of all the other users. Let Uk be the resulting unfairness of the rate allocation and $U_k$ be the resulting vector of transmit powers. The resulting transmit power vector may be determined by the iterative algorithm as discussed in the appendix attached hereto (Avneesh Agrawal, John M. Cioffi, "Power Control for Multiuser Space-Time CDMA," *GLOBECOM* 2002).
Step 3: Let S be the set of users such that $U_k \leq U$ and $p^{(k)} \leq P_{max}$, where $P_{max}$=[po,max, p1,max . . . , pk-1, max] is the vector of maximum permissible transmit powers. If the set S is empty, then the iteration is terminated.
Step 4: If the set S is not empty, then from the set S, select the user that optimizes the selection criteria (as discussed above) and increase the rate of that user by ΔR. Then, go to Step 2.

Figure 2:
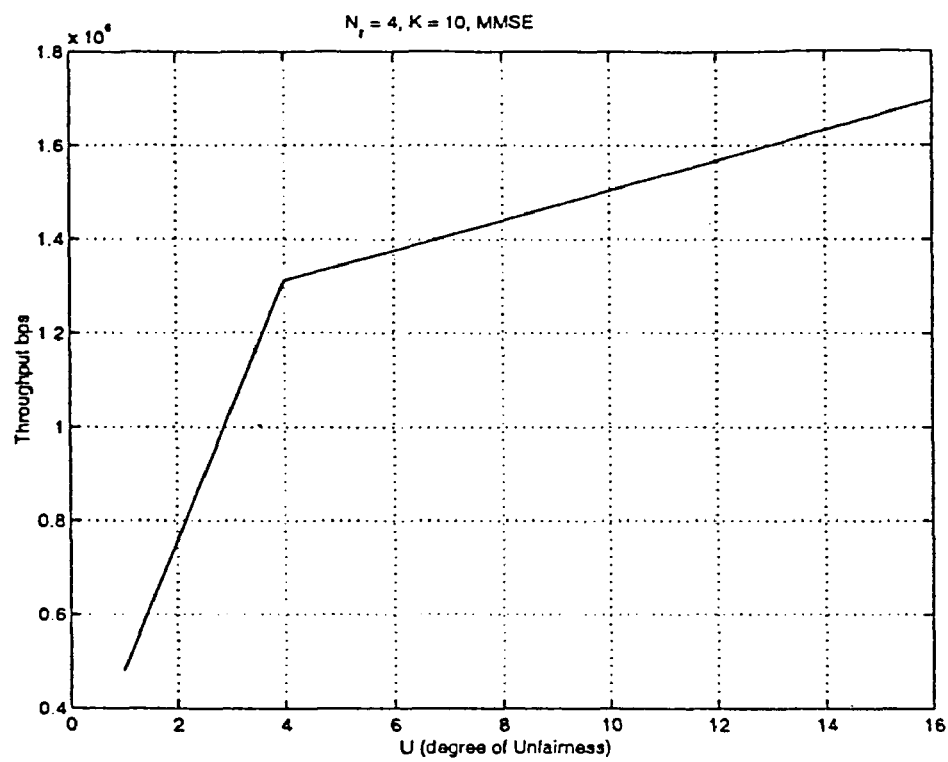
FIG. 2 is a graph showing a plot of system throughput (in bits per second) versus degree of "unfairness," according to another example embodiment of the present invention.

To illustrate the effectiveness of this greedy rate-allocation approach, FIG. 2 shows throughput for various values of "U" in such a CDMA system having an "MMSE" receiver with ideal successive interference cancellation. As is conventional in direct-sequence code-division multiple-access (CDMA) communications, a MMSE receiver refers to a minimum mean-squared error receiver providing a linear filter that can suppress multiple access interference (MAI). The selection criteria in this instance is minimization of maximum transmit power.

At each iteration, the rate of only one user is increased by ΔR. The selected user is one that minimizes the use of system resources for that iteration. For instance, with the selection criteria as minimizing maximum transmit power, at each iteration the transmit power for the highest power user is minimized. The algorithm need not produce a globally optimal result; however, as shown in FIG. 2, the resulting rate allocation is significantly better than equal rate allocation ($N_r$ is the number of receive antennas, and K is the number of users in the system). Also, it can be shown that as ΔR approaches 0, the resulting rate allocation is Pareto Optimal which means that it is not possible to come up with a different rate allocation that is at least as good as the existing rate allocation for all the users without violating the power or fairness constraints.

Another aspect of the above-discussed approach concerns user prioritization. As discussed herein, the distribution of rates can be controlled by selecting an appropriate value of U Once a value of U is set, the rate distribution is determined for the different users. As the system operator may occasionally benefit from having more direct control over the rate assignments of individual users, weighted rates may be used while testing for the fairness constraint. Let $$\tilde{R}_k \stackrel{def}{=} \frac{r_k}{w_k}$$

be the weighted rate for the $k^{th}$ user. $w_k > 0$ is the user priority. For example, $w_k = \alpha$, $w_i = 1$, $i \neq k$ implies that max $$\left(\frac{\max(R_i)}{R_k}\right) = \frac{U}{\alpha},$$

and $$\max\left(\frac{R_k}{\min(R_i)}\right) = \alpha U.$$

The user priorities may be selected using a scheduling algorithm, or based on user billing information. As would be conventional, various mechanisms may be used to determine the user priorities based on system-defined needs. Both the user priorities, and U may be varied with time in order to control the distribution over time.

For OFDM systems where each user has multiple frequency bands, in the above approach the rate increment of ΔR for each user may be distributed across the different frequency bands using the same greedy allocation. Each band may be assigned different priorities or power controlled independently.

In view of the above, it can be recognized that such an unfairness ration "U" is an effective constraint in rate allocation for systems such as a CDMA or OFDM system. The system operator may define the appropriate value for U Changing the rate of one user causes a change in power allocation for all the users. The level of power can then be increased or decreased in view of other users, and this may depend on the type of multi-user receiver used at the base station receiver. For further information regarding this relationship between rate and power for space-time CDMA, reference may be made to the attached article by Avneesh Agrawal, John M. Cioffi, "Power Control for Multiuser Space-Time CDMA," *GLOBECOM* 2002.

As discussed in the attached article (Avneesh Agrawal, John M. Cioffi, "Power Control for Multiuser Space-Time CDMA," *GLOBECOM* 2002) fixed-step iterative power control with binary or ternary feedback also converges to close to the optimum distribution. Given a target data rate, R, the target signal to interference and noise ratio (SINR), γi can be determined as:

$$\gamma i = \left(2\frac{R_i}{BW} - 1\right)\Gamma \quad (6)$$

where BW is the system bandwidth and Γ is the SNR gap to capacity. Let p∈$R^K$ be the received power vector for the K users, and i(p)∈$R^K$ be the corresponding interference and noise power vector. The precise relationship between p and defined as systems that have only one user transmitting at any given time i(p) depends on the channel and type of multi-user receiver. For most receivers of interest (e.g. matched-filter, MMSE receiver with successive interference cancellation, etc.) the optimal transmit power vector is the solution to $$p = \Lambda i(p) \quad (7)$$

where Λ is a diagonal matrix with Λii=γi. The optimal power vector may be determined using the iterative scheme:

$$P(n+1) = \Lambda i(p(n)) \quad (8)$$

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention. The claims, as may be amended, added, reissued, etc., are intended to cover such modifications and devices.

Also, it should be appreciated that reference throughout this specification to embodiments, implementations or aspects of the invention means that a particular feature, structure or characteristic described in connection with the embodiment is included in at least one contemplated realization of the present invention. Therefore, it is emphasized and should be appreciated that two or more references to "an embodiment" or the like in various portions of this specification are not necessarily referring to the same embodiment. Furthermore, the particular features, structures or characteristics of one or more embodiments or aspects described may be combined or implemented independently of each other as suitable in one or more embodiments of the invention.

It will be apparent to one of ordinary skill in the art that aspects of the invention, as described above, may be implemented in many different forms of software, firmware, and hardware in the implementations illustrated in the figures. The actual program code or specialized signal-processing hardware used to implement aspects consistent with the present invention is not limiting of the present invention. Thus, the operation and behavior of the aspects have been described without reference to such specifics with the understanding that a person of ordinary skill in the art would be able to design and implement these described aspects based on the description herein.

What is claimed is:

1. A method for allocating user transmission rates in a communication system that is adapted to permit the users to transmit data simultaneously via shared frequency and spatial resources, the method comprising:

while maintaining the transmission rates of the users to at least a minimum user transmission rate to provide an expected minimum quality of communication for each of the users, incrementally adjusting the transmission rates of the users by iteratively changing the transmission rate of each user as a function of a resulting vector of transmit powers ensuing from the incremental adjustment of the transmission rate, a degree of transmission-rate-allocation unfairness relative to the transmission rates of all the users, and a power-based selection criteria.

2. The method of claim 1, wherein the degree of transmission-rate-allocation unfairness is a function of a ratio of a maximum user transmission rate to a minimum user transmission rate.

3. The method of claim 1, further including using the resulting vector and the degree of transmission-rate-allocation unfairness to identify a user for the corresponding iteration and, therefrom, increasing its transmission rates in a next iteration.

4. The method of claim 1, further including using the resulting vector and the degree of transmission-rate-allocation unfairness to identify a user from a set of all the users, that optimizes the selection criteria for the corresponding iteration and, therefrom, increasing its transmission rates in a next iteration.

5. The method of claim 1, wherein the system is an OFDM (orthogonal-frequency-division-multiplex) communication system and further including transmitting the data from the users using OFDM communication.

6. The method of claim 1, wherein the system is a CDMA (code-division-multiple-access) communication system and further including transmitting the data from the users using CDMA communication.

7. The method of claim 1, further including setting the transmission rates of the users to the minimum user transmission rate before incrementally adjusting the transmission rates of the users.

8. The method of claim 1, wherein iteratively changing the transmission rate of each user includes iteratively changing the transmission rate by a constant.

9. The method of claim 1, wherein the power-based selection criteria is selected from the set of: minimization of average transmit power; minimization of maximum transmit power; and minimization of total received power.

10. A method for allocating transmission rates to multiple users in a communication system that is adapted to permit the users to transmit data simultaneously via shared frequency and spatial resources, the method comprising:

(a) setting the transmission rates of the users to at least a minimum user transmission rate to provide an expected minimum quality of communication for each of the users and then incrementally adjusting the transmission rates of the multiple users by iteratively increasing the transmission rates per the following steps:

(b) for each user, increasing its transmission rate without changing the transmission rate of the other users, thereby providing a set of transmission rates that include a maximum user transmission rate and a minimum user transmission rate and, therefrom, determining a resulting vector of transmit powers ensuing from the increased transmission rate, and a degree of transmission-rate-allocation unfairness as a function of a ratio of a maximum user transmission rate to a minimum user transmission rate;

(c) from the resulting vector and the degree of transmission-rate-allocation unfairness, determining whether an increased one of the transmission rates for a corresponding one of the users satisfies a multi-user based selection criteria and, in response, increasing its transmission rate.

11. The method of claim 10, wherein the multi-user based selection criteria includes a power-based selection criteria, and further including, after step (c), repeating steps (b) and (c) until an iteration in which none of the transmission rates satisfies the power-based selection criteria and satisfies the degree of transmission-rate-allocation unfairness.

12. The method of claim 10, wherein the system is an OFDM (orthogonal-frequency-division-multiplex) communication system and further including transmitting the data from the users using OFDM communication.

13. The method of claim 12, wherein the multi-user based selection criteria includes a power-based selection criteria, and further including, after step (c), repeating steps (b) and (c) until an iteration in which none of the transmission rates satisfies the power-based selection criteria and satisfies the degree of transmission-rate-allocation unfairness.

14. The method of claim 10, wherein the system is an OFDM (orthogonal-frequency-division-multiplex) communication system permitting the users to transmit the data on multiple frequencies and further including transmitting the data from the users using OFDM communication.

15. The method of claim 10, wherein the system is a CDMA (code-division-multiple-access) communication system and further including transmitting the data from the users using CDMA communication.

16. The method of claim 15, wherein the multi-user based selection criteria includes a power-based selection criteria, and further including, after step (c), repeating steps (b) and (c) until an iteration in which none of the transmission rates satisfies the power-based selection criteria and satisfies the degree of transmission-rate-allocation unfairness.

17. The method of claim 10, further including, after step (c), repeating steps (b) and (c) until an iteration in which none of the transmission rates satisfies the degree of transmission-rate-allocation unfairness.

18. The method of claim 10, further including, after step (c), repeating steps (b) and (c) until an iteration in which none of the transmission rates satisfies the multi-user based selection criteria.

19. The method of claim 10, further including, after step (c), repeating steps (b) and (c) until an iteration in which none of the transmission rates satisfies the multi-user based selection criteria and, thereafter, attempting to optimize system operation.

20. A communication system adapted to allocate transmission rates to multiple users and to permit the users to transmit data simultaneously via shared frequency and spatial resources, the system comprising:

means for maintaining the transmission rates of the users to at least a minimum user transmission rate to provide an expected minimum quality of communication for each of the users; and means, operative while maintaining the transmission rates of the users to at least a minimum user transmission rate, for incrementally adjusting the transmission rates of the users by iteratively changing the transmission rate of each user as a function of a resulting vector of transmit powers ensuing from the incremental adjustment of the transmission rate, a degree of transmission-rate-allocation unfairness relative to the transmission rates of all the users, and a power-based selection criteria.

21. A communication system adapted to allocate transmission rates to multiple users and to permit the users to transmit data simultaneously via shared frequency and spatial resources, the system comprising:

a data processing module for setting the transmission rates of the users to at least a minimum user transmission rate to provide an expected minimum quality of communication for each of the users; and a data processing arrangement for incrementally adjusting the transmission rates of the multiple users by iteratively increasing the transmission rates as follows:

for each user, increasing its transmission rate without changing the transmission rate of the other users, thereby providing a set of transmission rates that include a maximum user transmission rate and a minimum user transmission rate and, therefrom, determining a resulting vector of transmit powers ensuing from the increased incremental adjustment of the transmission rate, and a degree of transmission-rate-allocation unfairness as a function of a ratio of a maximum user transmission rate to a minimum user transmission rate; and from the resulting vector and the degree of transmission-rate-allocation unfairness, determining whether an increased one of the transmission rates for a corresponding one of the users satisfies a multi-user based selection criteria and, in response, increasing its transmission rate.

22. The system of claim 21, wherein the system is an OFDM (orthogonal-frequency-division-multiplex) communication system permitting the users to transmit the data on multiple frequencies and further including transmitting the data from the users using OFDM communication.

23. The method of claim 21, wherein the system is a CDMA (code-division-multiple-access) communication system and wherein the system further includes a data port for transmitting the data from the users using CDMA communication.

24. The method of claim 21, wherein the system is a CDMA (code-division-multiple-access) cellular communication system and wherein the rate allocation is provided to multiple users communicating with a common base station for the cellular communication system, and wherein the system further includes a data port for transmitting the data from the users to common base station using CDMA communication.

25. For use in a communication system adapted to allocate transmission rates to multiple users and to permit the users to transmit data simultaneously via shared frequency and spatial resources, a data terminal comprising:

a circuit that maintains a data transmission rate of the data terminal as a function of a minimum user transmission rate defined to provide an expected minimum quality of communication for each of the users; and a data transmission rate adjustment circuit that incrementally adjusts the transmission rate of the data terminal as a function of a resulting vector of system-level transmit powers ensuing from the incremental adjustment of the transmission rate, a degree of transmission-rate-allocation unfairness relative to the transmission rates of all the users, and a system-level power-based selection criteria.

\* \* \* \* \*